United States Patent [19]

Lawson et al.

[11] 4,420,544

[45] Dec. 13, 1983

[54] HIGH PERFORMANCE METHANOL-OXYGEN FUEL CELL WITH HOLLOW FIBER ELECTRODE

[75] Inventors: Daniel D. Lawson, Arcadia; John D. Ingham, La Crescenta, both of Calif.

[73] Assignee: California Institute of Technology, Pasadena, Calif.

[21] Appl. No.: 307,848

[22] Filed: Oct. 2, 1981

[51] Int. Cl.[3] .............................................. H01M 8/00
[52] U.S. Cl. ...................................... 429/13; 429/41; 429/42; 429/46
[58] Field of Search ....................... 429/13, 41, 42, 40, 429/46

[56] References Cited

U.S. PATENT DOCUMENTS

| | | | |
|---|---|---|---|
| 3,116,170 | 12/1963 | Williams et al. | 429/42 |
| 3,152,013 | 10/1964 | Juda | 429/40 |
| 3,228,797 | 1/1966 | Brown et al. | 429/13 |
| 3,423,243 | 1/1969 | Kordesch et al. | 429/40 X |
| 3,477,877 | 11/1969 | Kordesch | 429/42 |
| 4,100,331 | 7/1978 | Fletcher et al. | 429/13 |

Primary Examiner—Charles F. Lefevour
Attorney, Agent, or Firm—Marvin E. Jacobs

[57] ABSTRACT

A methanol/air-oxygen fuel cell including an electrode formed by open-ended ion-exchange hollow fibers having a layer of catalyst deposited on the inner surface thereof and a first current collector in contact with the catalyst layer. A second current collector external of said fibers is provided which is immersed along with the hollow fiber electrode in an aqueous electrolyte body. Upon passage of air or oxygen through the hollow fiber electrode and introduction of methanol into the aqueous electrolyte, a steady current output is obtained. Two embodiments of the fuel cell are disclosed. In the first embodiment the second metal electrode is displaced away from the hollow fiber in the electrolyte body while in the second embodiment a spiral-wrap electrode is provided about the outer surface of the hollow fiber electrode.

19 Claims, 2 Drawing Figures

HIGH PERFORMANCE METHANOL-OXYGEN FUEL CELL WITH HOLLOW FIBER ELECTRODE

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

The present invention relates to an improved fuel cell and, more particularly, this invention relates to a single membrane, hollow fiber liquid fuel/oxygen fuel cell.

In view of current and future domestic energy shortages there is a critical need for more efficient systems for conversion of chemical energy to electrical energy. Electrical energy is the only form of energy that is readily produced, transported, can be utilized in a controlled manner, and can be transformed to other forms of energy at nearly 100% efficiency.

The conventional methods, apart from hydroelectric power generation, of converting primary forms of energy, i.e. solar, chemical, nuclear and gravitational, to electricity pass through an intermediate conversion stage of heat energy to mechanical energy. Inherent losses occur due to the Carnot limitation and moving parts are subject to frictional losses and mechanical failure.

Direct methods of conversion are preferred due to simplicity, reliability, higher conversion efficiency and less weight and volume required by these systems. Thermoelectric, thermionic, photovoltaic and magnetohydrodynamic methods are not finding large scale application due to limitations of materials and energy/unit ratios are small.

The most promising method of direct conversion of primary sources of energy to electricity is the electrochemical method as embodied in the gaseous fuel cell such as the hydrogen-oxygen fuel cells utilized in recent space probes. Fuel cells use extremely complex flat stack arrangements consisting of a membrane, gaskets, channels, electrodes and current collectors that are difficult and expensive to fabricate, and, in the case of solid polymer electrolytes, are subject to catastrophic failure of the total system if there is one pinhole leak in the membrane between the oxygen and hydrogen sides. There is the example of a hollow fiber configuration for a single membrane fuel cell by Brown and Levine in U.S. Pat. No. 3,228,797. However, only very low power densities are obtained in this case because of high internal resistance and inefficient electrode and current collector configuration. Furthermore, this configuration would also fail if any membrane leakage took place.

In their theoretical treatment entitled "Fuel Cells-Their Electrochemistry," Bockris and Srinivason mention a dual spaghetti-tube fuel cell concept with electrodes and active fuel cell processes to occur on the outside of the tubes. However, this concept has the serious limitation that operation requires diffusion of hydrogen and oxygen through the membrane walls, and an operating fuel cell of this type has not yet been devised.

In our prior U.S. Pat. No. 4,100,331 issued July 11, 1978, an improved fuel cell is disclosed which comprises a pair of electrodes immersed in aqueous electrolyte, each electrode being formed of an ion-permeable, gas-impermeable hollow fiber having catalytic electrode material deposited on its inner surface and having a large surface area current collector in contact with the catalytic surface. In accordance with our prior patent, fuel gas, such as hydrogen, is flowed through the fuel electrode and an oxidizing gas, such as oxygen, flows through the oxidizer electrode, resulting in an electric potential being developed which can be recovered and utilized or stored through the circuit joining the electrodes.

Although the fuel cell disclosed in our prior patent overcomes a number of problems present in prior fuel cells and is well suited for its intended purpose, it would be desirable to provide a fuel cell which is not dependent on the use of fuel gases, such as hydrogen, which require the use of special pressure tanks and related equipment.

SUMMARY OF THE INVENTION

In accordance with the present invention, an improved high performance fuel cell is provided which utilizes liquid fuel and oxygen to chemically generate electrical current.

The present invention is based on a fuel cell having a cell enclosure containing a body of aqueous electrolyte. A gas impermeable, ion permeable tubular electrode having a gas inlet and a gas outlet and a gas permeable layer of catalytic metals deposited on the inside surface thereof is immersed in the aqueous electrolyte. A first current collector is provided on the inside of the tubular electrode in contact with the catalytic deposit. A second current collector body is immersed in the electrolyte. The produce electrical energy from the cell, an oxidizing gas such as oxygen is passed through the tubular electrode and an electronically active liquid fuel such as methanol is added to the electrolyte body.

The present invention is based on the hollow-fiber design as first disclosed in our above-identified United States patent. The present fuel cell therefore also provides the advantages of the hollow-fiber design by providing larger surface areas per unit volume than prior art systems while reducing cost and weight and also substantially reducing the possibility of mechanical failure. In addition to the above advantages, the present invention provides a fuel cell which does not utilize gaseous fuels which are inherently dangerous and difficult to handle. A preferred liquid fuel for use in accordance with the present invention is methanol. Methanol is very electrochemically active at ambient temperatures. As a fuel, methanol is inexpensive and does not require special purification or storage, as compared, for example, to hydrogen. Methanol can be produced from non-petroleum sources, and currently is the subject of extensive research and development efforts to increase United States and foreign supplies. In addition, methanol is particularly useful in aqueous electrolytic fuel cells since it yields six electrons per molecule in the known acid electrolyte solutions.

The above-discussed and many other features and attendant advantages of the present invention will become apparent as the invention becomes better understood by reference to the following detailed description when considered in conjunction with the accompanying drawings.

DETAILED DESCRIPTION OF THE PREFERRED EMBODIMENTS

The present invention relates to a high performance fuel cell for generating electricity from the electrochemical reaction of an oxidizing gas with a liquid fuel. A number of electro-chemically active water soluble liquid fuels may be utilized; however, methanol or formaldehyde are preferred and methanol is particularly preferred. In addition, any number of oxidizing gases may be utilized; however, oxygen or oxygen containing gases such as air are particularly preferred. Although other liquid fuels and oxidizing gases may be utilized in accordance with the present invention, the following description of preferred embodiments will be limited to a methanol-oxygen fuel cell.

Basically, the present invention is a fuel cell having a single hollow-fiber air cathode with an electro-catalytic-current collector within the fiber as described in our prior U.S. Pat. No. 4,110,331, the contents of which is hereby incorporated by reference. The anode is a liquid electrode of methanol and electrolyte on the outside of the fiber with a separate second current collector immersed therein.

The following chemical reactions occur in the methanol-oxygen fuel cell:

Liquid electrode (Anode):
$CH_3OH + H_2O \rightarrow CO_2 + 6H^+ + 6e^-$

Tube electrode (Cathode): $6H^+ + 6e^- + \frac{3}{2}O_2 \rightarrow 3H_2O$

Net Reaction: $CH_3OH + 1.5\ O_2 \rightarrow CO_2 + 2H_2O$

In operation, an oxygen containing gas such as air is passed into the hollow fiber where the catalytic surface functions as the cathode and an electric potential is developed which is recovered by the current collector and utilized or stored through the circuit joining the hollow-fiber tube electrode and the second inert metal collector located within the methanol containing electrolyte or liquid electrode. The ultimate source of the current is the methanol oxidation reaction as shown in the chemical reaction equations above.

Figure 1:
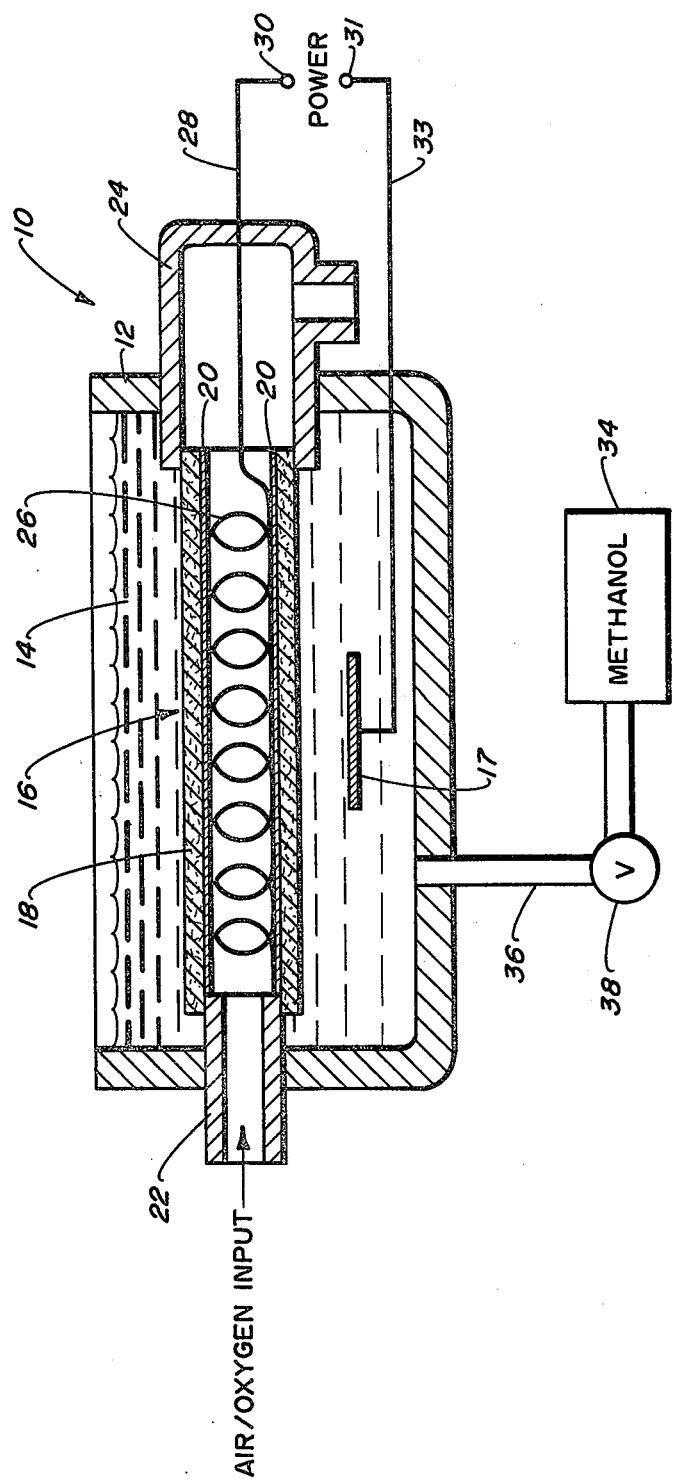
FIG. 1 is a schematic view of a preferred embodiment of the single membrane hollow fiber fuel cell in accordance with the present invention.

Referring now to FIG. 1, the fuel cell 10 generally comprises a container 12 which may be open or closed receiving a body of electrolyte 14 in which is immersed a flow-through electrode 16 and a current collector plate 17. The electrode is formed of a fine, filamentary hollow fiber tube 18 having a layer of catalytically active electrode material 20 deposited on the inner surface thereof. The tube is supported by an inlet member 22 and outlet member 24 which are formed of electrically insulating and gas-impermeable materials and are sealingly received and mounted within the walls of the cell container 12. A high surface area first current collector 26 is disposed in the electrode 16, in contact with the catalytically-coated surface 20. Lead wire 28 connects the first current collector 26 to terminal 30 and lead wire 33 connects the collector plate 17 to terminal 31. Power can be extracted from terminals 30 and 31.

The first current collector is formed of a non-reactive metallic wire material and may be in the form of a spiral, bristles, porous metal, braid or a screen. A braided wire mesh sleeve such as a gold-coated copper braided material is preferred since it can be easily slipped into the interior surface of the fine filamentary hollow fiber tube 18 without abrading the surface thereof and by compressing the ends of the braided sleeve, the sleeve will expand into intimate contact with the catalytic electrode surface. Though only a single hollow fiber fuel electrode is illustrated, it is apparent that multiple tubes can be attached to a common gas header, by potting the ends of the tube into adhesive and inserting them into a funnel-shape member. These multiple electrodes can be inserted into a single body of electrolyte. The electrodes may be connected in series or in parallel.

The electrode is fabricated by inserting the first current collector such as the braided metal into the fiber and compressing it to expand it against the wall. A suitable metal catalyst, such as tungsten carbide, platinum or palladium may be deposited by electroless and/or electrolytic techniques. Preferably the metal catalyst is first deposited by reducing a metal salt on the inner surface of the hollow fiber and then inserting the current collector and electrolytically building up the deposit by soaking the fibers in plating solution and connecting the ends of the current collector to a source of DC potential such as a battery while reversing the polarity every few minutes. Nodules of black catalytic metal form in intimate contact with the current collector and with the inner surface of the hollow fiber. The ends of the hollow fiber may then be inserted over the inner ends of the inlet and outlet members and sealed thereto with adhesive or sealant, if required.

The hollow fiber membrane electrode support materials are fine filamentary materials that are gas-impermeable and ion-permeable. The inside diameter is generally less than $\frac{1}{4}''$, typically from 0.5 mm to 5.0 mm, though fibers having diameters as small as 0.2 mm are available. The wall thickness is sufficient to withstand pressure during operation and the ratio of the wall thickness to diameter should be 1:2 or smaller. The hollow fibers are formed from synthetic resins typically by spinning a molten thermoplastic resin through a spinnerette die. Preferably, the hollow fiber has ion-exchange functionality, either anionic or cationic. Suitable materials are sulfonated polystyrene, quaternary amine polystyrene or preferably sulfonated polyfluoro aliphatic materials such as Nafion. Nafion is a hydrogel capable of absorbing water and of withstanding the chemical environment of the cell. Nafion has superior mechanical strength, predictable dimensional changes, high electrical conductivity and ability to transport desired ions while rejecting undesired ions and molecules. The fuel electrode fiber need only be resistant to the electrolyte and the less aggressive reduction reaction. Nafion is a perfluorosulfonic substituted polytetrafluorethylene in which each repeating unit has a molecular weight of about 1000 and has the following structure:

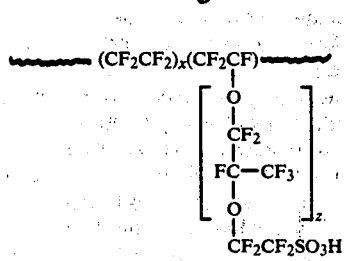

where x and z are integers such that the polymer has a molecular weight above 100,000, typically from 500,000 to 1,000,000 and a minimum sulfonic acid content of 1.0 millequivalents/gram, typically from 1.0 to 1.5 millequivalents/gram.

The collector plate or second current collector 17 may be made from any suitable metal which is resistant to attack by electrolyte.

In operation, air is passed into the electrode tube through inlet 22 and methanol is transferred from reservoir 34 through line 36 into the container where it is mixed with the body of electrolyte 14. The flow of methanol into the container 12 is controlled by valve 38. The mixture of methanol and water forms the second electrode resulting in a complete cell and the resultant generation of electrical current. If desired, the air exiting the tube 18 through outlet 24 may be vented or recycled.

Acidic electrolytes are preferable when carbonaceous fuels such as methanol are used in a fuel cell in order to avoid the precipitation of carbonate that would occur in an alkaline electrolyte with consequent detrimental effects upon the electrodes and electrolyte. In an acidic electrolyte the carbon dioxide formed is readily discharged from the anode compartment or container 12. Preferred acid electrolytes include sulfuric, phosphoric and phosphonium acids.

The relative concentration of water, acid and methanol in the electrolyte body 14 during operation should be maintained at from 30 to 70 percent by volume methanol, 20 to 60 percent by volume water and 0 to 20 percent by volume acid. For embodiments of the fuel cell having the current collector in the electrolyte displaced away from the tube electrode, acid concentrations of around 10 percent by volume are preferred. For those embodiments as shown in FIG. 2 where the current collector in the electrolyte contacts the tube electrode, the acid concentration may be lowered to concentrations near 0 percent by volume if desired.

Figure 2:
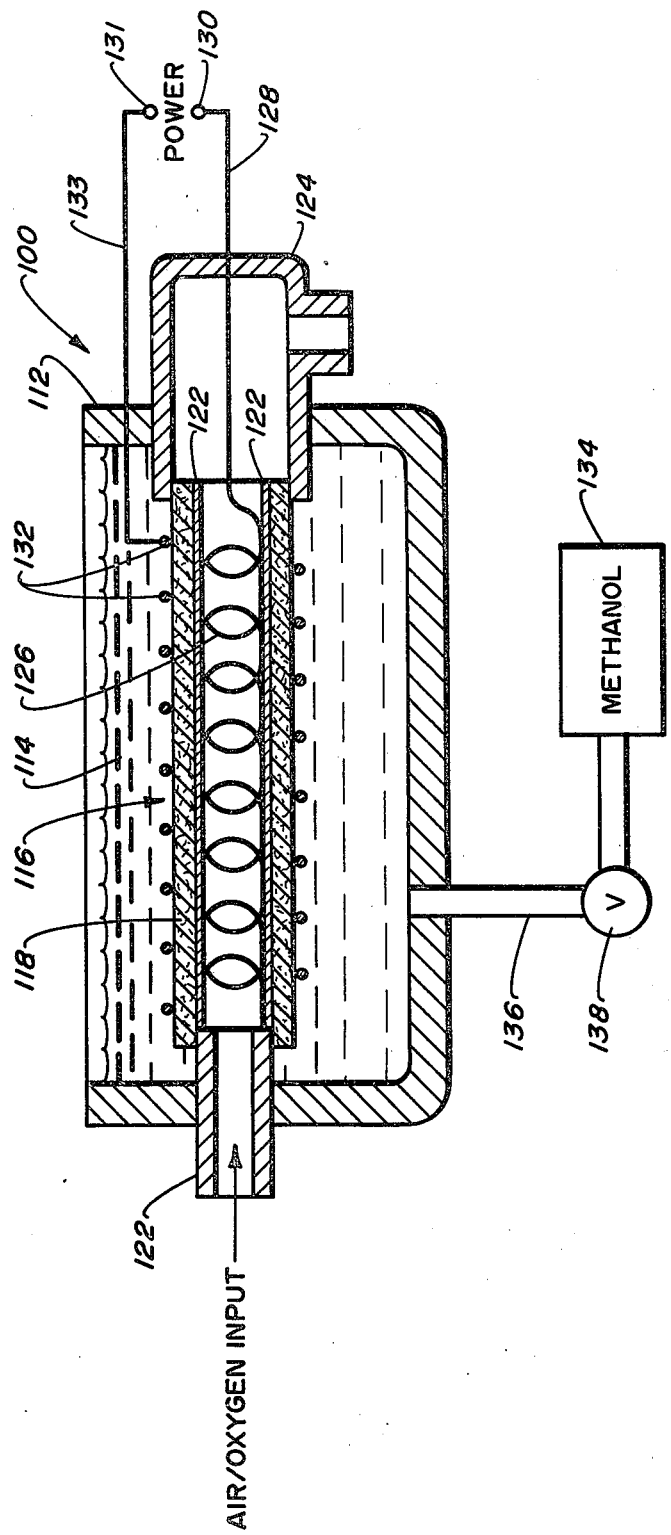
FIG. 2 is an alternative embodiment of a preferred single membrane hollow fiber fuel cell in accordance with the present invention.

A second preferred embodiment of the present invention is shown in FIG. 2. This particular embodiment is the same as the above-described preferred embodiment except that the second current collector is not displaced from the tube electrode but is placed in direct contact with the outside surface thereof. The second preferred embodiment is shown generally at 100 and includes a container 112 receiving a body of electrolyte 114 in which is immersed a flow-through electrode 116. The flow-through electrode 116 is supported by an inlet member 122 and outlet member 124. A high surface area first current collector 126 is disposed in the electrode 116 in contact with a catalytically coated surface 122. The second current collector which is immersed in the electrolyte body 114 is provided by spiral wrap member 132. The spiral wrap member 132 is a conductive metal which is resistant to attack by methanol, water or acid and which is intimately in contact with the outer surface of tube 116. Lead wires 128 and 133 are connected to the first and second current collectors respectively and further connected to terminals 131 and 130.

This second embodiment as shown in FIG. 2 operates in the same manner as the first preferred embodiment. Air is passed through inlet 122 into tube 116 while methanol is passed from methanol reservoir 134 through line 136 into the electrolyte body 114. Regulation of methanol input is provided by valve 138. The major difference between this second embodiment and the first embodiment is that by placing the second current collector 132 in intimate contact with the outside of tube 116, the necessity of acid within the electrolyte body 114 is no longer necessary. This particular embodiment is especially preferred in systems where the use of an acid containing electrolyte is not desirable.

An example of practice follows:

A conventional 25 ml. gas sampling vessel with two additional ports was fitted with a small metal collector and hook-up wire through one port; and with a length of available 1/16th inch diameter Nafion hollow fiber material open at each end, and previously prepared for fuel cell operation by the deposition of a catalyst of finely divided platinum and insertion of the internal current collector, as discussed above and described in the above cited U.S. Pat. No. 4,100,331. By selecting a gas sample vessel with an inlet and outlet formed of 1/16th inch diameter glass capillary tubing, it was possible to obtain the desired sealing of the hollow fiber without the use of additional contaminating sealer resins or the like. The remaining port was used for release of carbon dioxide gas as required during operation. The vessel was then partially filled with a solution of about 50 wt. % methanol, 10 wt. % sulfuric acid, and 40 wt. % water, sufficient to immerse the hollow fiber surface and the metal plate current collector. A simple digital voltmeter was connected to the internal current collector and the second metal plate connector wire. Upon passing air into the inlet of the hollow fiber electrode, an immediate current of about 0.3 volt was noted, which continued so long as the air flowed into the hollow fiber.

Although Nafion, is the preferred fiber-tube material because it has excellent oxidation resistance, it will be understood that lower cost, permeable membrane materials, readily swollen with water to provide desired conductivity, may also be used in the first embodiment. The second embodiment, however, requires an anionic conducitivity of the type observed with Nafion or other ion exchange materials. Further, although use of liquid methanol and water is preferred, both gaseous or liquid methanol-water mixtures can be used to achieve the electrochemical reaction in the equations above, when air or oxygen are passed into the hollow cathode.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein.

What is claimed is:

1. A fuel cell comprising:
a cell enclosure forming a chamber for containing a body of aqueous electrolyte;
an inlet connected to the chamber;

a gas-impermeable, ion-permeable, tubular electrode formed of a fine filamentary, synthetic resin hollow fiber having ion exchange functionally disposed within said chamber, said electrode having a gas inlet end and a gas outlet end, a gas permeable layer of catalytic metal deposited on the inside surface thereof and a high surface area first current collector in contact with the catalytic deposit, a second current collector disposed within the chamber so as to be immersed in said body of electrolyte, when present;

means for supplying a flow of gaseous oxidant to said gas inlet end;

a source of water-soluble electrochemically active liquid fuel;

means connecting said source to said inlet for supplying said water soluble electrochemically active liquid fuel to the chamber for containing the body of aqueous electrolyte whereby said liquid fuel and electrolyte form a liquid anode for oxidizing said fuel at said second current collector and the oxidant gas is simultaneously reduced at the first current collector developing an electrochemical potential between the second current collector and the first current collector;

and means connected to said first and second current collectors for extracting electrical energy from the cell.

2. A fuel cell according to claim 1 in which the hollow fiber has an internal diameter less than ¼ inch and the ratio of wall thickness to diameter is no greater than 1:2.

3. A fuel cell according to claim 2 in which the internal diameter is from 0.2 mm to 5.0 mm.

4. A fuel cell according to claim 2 in which the synthetic resin hollow fiber is formed from a sulfonated, polyfluoro aliphatic resin.

5. A fuel cell according to claim 4 in which the resin is a perfluorosulfonic acid substituted polytetrafluoroethylene.

6. A fuel cell according to claim 5 in which the resin has a repeating structure of the formula:

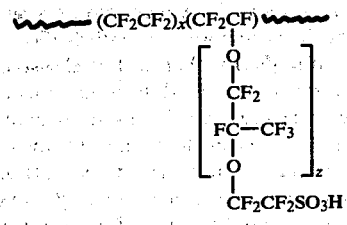

where x and z are integers such that the polymer has a molecular weight above 100,000 and a minimum sulfonic acid content of 1.0 millequivalents/gram.

7. A fuel cell according to claim 1 in which the electrolyte is an aqueous inorganic acid selected from the group consisting of sulfuric, phosphoric and phosphonium.

8. A fuel cell according to claim 7 in which the liquid fuel is selected from the group consisting of methanol and formaldehyde.

9. A fuel cell according to claim 7 in which the catalyst is finely divided particles of platinum.

10. A fuel cell according to claim 1 in which the first current collector is a braided metal sleeve expanded into intimate contact with the catalyst deposit.

11. A fuel cell according to claim 1 in which the second current collector is in contact with the outside of the tubular electrode.

12. A fuel cell according to claim 11 in which said electrolyte consists essentially of water.

13. A method of electrochemically generating electrical energy in a fuel cell comprising the steps of:

immersing in aqueous electrolyte a gas-impermeable, ion-impermeable tubular electrode in the form of a fine, filamentary, synthetic resin hollow fiber having ion exchange functionality and having a gas permeable layer of catalytic metal deposited on the inside surface thereof and having a high surface area first current collector in contact with the metal layer;

immersing a second current collector in said aqueous electrolyte;

flowing a oxidant gas through said electrode while flowing a water soluble electrochemically active liquid fuel into said aqueous electrolyte;

reducing said oxidant at said first current collector and oxidizing said fuel at said second current collectors to produce electrical energy; and extracting said energy from said first current collector and second collectors.

14. A method according to claim 13 in which the resin is a perfluorosulfonic acid substituted polytetrafluoroethylene.

15. A method according to claim 14 in which the resin has a repeating structure of the formula:

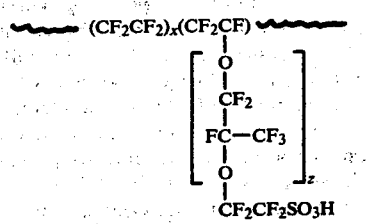

where x and z are integers such that the polymer has a molecular weight above 100,000 and a minimum sulfonic acid content of 1.0 milliequivalents/gram.

16. A method according to claim 13 in which the electrolyte is an aqueous inorganic acid selected from the group consisting of sulfuric, phosphoric and phosphonium.

17. A method according to claim 13 in which the liquid fuel is selected from the group consisting of methanol and formaldehyde.

18. A method according to claim 13 in which the second electrode is contacted with the outside of the tubular electrode.

19. A method according to claim 18 in which said aqueous electrolyte consists essentially of water.

* * * * *

UNITED STATES PATENT AND TRADEMARK OFFICE
CERTIFICATE OF CORRECTION

PATENT NO. : 4,420,544
DATED : December 13, 1983
INVENTOR(S) : Daniel D. Lawson and John D. Ingham It is certified that error appears in the above–identified patent and that said Letters Patent are hereby corrected as shown below:

Column 2, line 35, change "The to --To--

Column 6, line 49, change "anionic" to --ionic--

Column 6, line 50, correct spelling of "conductivity"

Column 8, Claim 13, line 4, change "ion-impermeable" to --ion-permeable--

Column 8, Claim 13, line 33, change "collectors" to --current collector--

Signed and Sealed this

Fifteenth Day of May 1984

[SEAL]

Attest:

GERALD J. MOSSINGHOFF

*Attesting Officer*  *Commissioner of Patents and Trademarks*